UNITED STATES PATENT OFFICE.

HERMAN HEUSER, OF CHICAGO, ILLINOIS.

MANUFACTURE OF DRY EXTRACTS OF PARTLY-FERMENTED BEVERAGES.

1,275,254.

Specification of Letters Patent. Patented Aug. 13, 1918.

No Drawing. Application filed March 12, 1917. Serial No. 154,124.

*To all whom it may concern:*

Be it known that I, HERMAN HEUSER, a citizen of the United States, residing at Chicago, in the county of Cook and State of Illinois, have invented certain new and useful Improvements in the Manufacture of Dry Extracts of Partly-Fermented Beverages, of which the following is a specification.

The present invention relates to the manufacture of dry extracts of partly fermented beverages to be used to make alcohol-reduced beverages by dilution with water.

The object of my invention is to provide a dry compound extract containing as its constituents desiccated live yeast and desiccated extract of a partly fermented beverage to produce an alcohol-reduced beverage when the compound extract is diluted to the consistency of a beverage and is fermented.

For illustrating the process of making the compound extract that will produce an alcohol-reduced beverage, I will describe the procedure as applied to an unfermented beverage, for example beer-wort, for making a dry yeast containing or compound extract for the preparation of alcohol-reduced beer by subsequent water dilution and fermentation. I take clarified beer wort containing 8% of fermentable substances and 6% of unfermentable substances, and at a temperature of 46° Fahrenheit I pitch it with thick fluid beer-yeast at the ratio of one pound of yeast for each barrel of wort, and this mixture is then left to partly ferment. When the fermentation has advanced to the point where the amount of fermentable carbohydrates is reduced to the desired extent, say when 1% of such matter is left unfermented, the fermentation is stopped in any suitable manner that does not remove the yeast from the partly fermented beverage or affect its life. For this purpose I stop fermentation by removing the water and alcohol from the fermenting beverage, and preferably for this purpose I subject the wort to desiccation in a vacuum high enough for boiling evaporation to take place at a temperature below 80° Fahrenheit or any other temperature that will preserve the solubility of the wort constituents and also the life of the yeast contained in the wort. If desired, suitable provisions are made to collect the alcohol from the wort under desiccation.

The dry product is a compound containing desiccated extract of the partly fermented wort and desiccated live yeast; in the example stated it is the desiccated original wort in sugar-reduced condition or wherein the original ratio of sugar to non-sugar of 8 to 6 has been reduced to 1 to 6, and containing desiccated live yeast, and when this dry compound extract is diluted with water to an extent that the saccharometer indication of the beverage so produced is 7°, it will change by subsequent fermentation into a beer containing one-half of 1% by weight of alcohol, whereas the original wort would have fermented to a beer containing 4% by weight of alcohol.

The preparatory fermentation for removal of part of the fermentable substances may be carried out to any desired extent to permit the manufacture of dry extracts producing alcohol-reduced beverages with any desired amount of alcohol. The same process is applicable and of advantage not only in the manufacture of dry extracts from partly fermented malted and unmalted grain beverages, but also in the manufacture of dry extracts from partly fermented fruit juices, such as grape juice and apple juice. In all these cases the amount of fermentable substances in the beverage desiccated is below their normal amount in the original unfermented beverage; in other words, the beverage desiccated is sugar-reduced or the ratio of its fermentable to unfermentable substances is below their normal ratio in the original unfermented beverage, and the amount of dry live yeast is sufficient to subsequently ferment the remaining fermentable substances when water-dilution takes place.

I claim:—

1. A dry compound of a partly fermented beverage for conversion into an alcohol-reduced beverage by dilution with water containing as its constituents a dry extract of a partly fermented beverage, and dry live yeast.

2. A dry compound of a partly fermented beverage for conversion into alcohol-reduced beer by dilution with water containing as its constituents a dry extract of partly fermented wort, and dry live yeast.

3. The process of making dry extracts of partly fermented wort for conversion into beverages by water-dilution which consists in partially fermenting the wort, and desiccating the wort with its live yeast-content in a vacuum high enough for boiling evaporation to occur at yeast-preserving temperature.

4. The process of making dry extracts of partly fermented wort for conversion into beverages by water-dilution which consists in partially fermenting the wort, and desiccating the partly fermented live yeast-containing wort at yeast preserving temperatures.

In testimony whereof I affix my signature in presence of two witnesses.

HERMAN HEUSER.

Witnesses:
J. McRoberts,
E. H. Wilcox.